(12) United States Patent
Veijanen (10) Patent No.: US 9,294,029 B2
(45) Date of Patent: Mar. 22, 2016

(54) METHOD AND APPARATUS FOR ESTIMATING ROTOR ANGLE AND ROTOR SPEED OF SYNCHRONOUS RELUCTANCE MOTOR AT START-UP

(75) Inventor: Matti Veijanen, Espoo (FI)

(73) Assignee: ABB TECHNOLOGY OY, Helsinki (FI)

( * ) Notice: Subject to any disclaimer, the term of this patent is extended or adjusted under 35 U.S.C. 154(b) by 155 days.

(21) Appl. No.: 13/401,081

(22) Filed: Feb. 21, 2012

(65) Prior Publication Data

US 2012/0212165 A1    Aug. 23, 2012

(30) Foreign Application Priority Data

Feb. 22, 2011    (EP) .................................... 11155280

(51) Int. Cl.
  *H02P 6/06*    (2006.01)
  *H02P 1/00*    (2006.01)
  *G05B 11/36*    (2006.01)
  *H02P 21/13*    (2006.01)
  *H02P 21/00*    (2006.01)
  *H02P 21/14*    (2006.01)

(52) U.S. Cl.
  CPC ............ *H02P 21/13* (2013.01); *H02P 21/0046* (2013.01); *H02P 21/141* (2013.01); *H02P 21/146* (2013.01)

(58) Field of Classification Search
  CPC ....... H02P 6/08; H02P 6/002; H02P 21/0046; H02P 21/141; H02P 21/146; H02P 21/13; A01H 5/00
  USPC ................... 318/727, 803, 400.02, 721, 723, 318/400.03, 400.01, 701, 268, 609
  See application file for complete search history.

(56) References Cited

U.S. PATENT DOCUMENTS

| | | | | |
|---|---|---|---|---|
| 5,144,564 | A * | 9/1992 | Naidu et al. | 318/721 |
| 6,498,452 | B1 * | 12/2002 | Luukko | 318/700 |
| 6,984,958 | B2 | 1/2006 | Niiranen | |
| 7,072,790 | B2 * | 7/2006 | Hu et al. | 702/147 |

(Continued)

FOREIGN PATENT DOCUMENTS

| | | |
|---|---|---|
| CN | 1787357 A | 6/2006 |
| CN | 101087120 A | 12/2007 |

OTHER PUBLICATIONS

Nagrial et al., "Developments of Sensorless Synchronous Reluctance Drive Systems", Multi Topic Conference 2001. IEEE INMIC 2001. Technology for the 21st Century. Proceedings. IEEE International, (2001), pp. 104-110.*

(Continued)

*Primary Examiner* — Bentsu Ro
*Assistant Examiner* — Zemenay Truneh
(74) *Attorney, Agent, or Firm* — Buchanan Ingersoll & Rooney PC (57) ABSTRACT

A method of estimating a rotor angle of a synchronous reluctance motor, which includes a stator and a rotor. First, a stator flux and a stator current are determined. Two orthogonal stator flux components in a stator reference frame are calculated from the stator flux. Two orthogonal stator current components in the stator reference frame are calculated from the stator current. A rotor orientation vector is then calculated using a known rotor direct or quadrature axis inductance component, the stator flux components, and the stator current components. The rotor orientation is estimated on the basis of the rotor orientation vector.

20 Claims, 2 Drawing Sheets

Legend
21 – Apparatus
22 – Supplying Grid
23 – Motor
24 – Motor Controller
25 – Flux Controller
26 – Stator Voltage Measuring Unit
27 – Stator Current Measuring Unit
28 – Voltage Model
29 – First Rotor Orientation Estimator
30 – First Rotor Speed Estimator (56) References Cited

U.S. PATENT DOCUMENTS

| | | | |
|---|---|---|---|
| 7,098,623 B2* | 8/2006 | Piippo | 318/721 |
| 7,271,562 B2* | 9/2007 | Lee | H02P 1/163 318/432 |
| 7,285,952 B1 | 10/2007 | Hatanaka et al. | |
| 7,501,776 B2* | 3/2009 | Lee | H02P 21/13 318/268 |
| 8,115,437 B2 | 2/2012 | Royak et al. | |
| 2005/0187739 A1 | 8/2005 | Baust et al. | |
| 2005/0216225 A1 | 9/2005 | Anghel et al. | |
| 2006/0119305 A1 | 6/2006 | Lee et al. | |
| 2007/0257626 A1 | 11/2007 | Lee et al. | |
| 2009/0224707 A1* | 9/2009 | Williams et al. | 318/400.02 |
| 2012/0098477 A1* | 4/2012 | Gao et al. | 318/798 |
| 2012/0212215 A1 | 8/2012 | Veijanen | |

OTHER PUBLICATIONS

Ahmadi et al., "Integration of RCM and PHM for the Next Generation of Aircraft", Aerospace Conference, 2009 (Mar. 7-14, 2009), pp. 1-9.*
Boldea et al., "Active Flux" DTFC-SVM Sensorless Control of IPMSM, IEEE Transactions on Energy Conversion (Jun. 2009), vol. 24, No. 2, pp. 314-322.*
Kang et al., "Position Controlled Synchronous Reluctance Motor without Rotational Transducer", Industry Applications Conference, 1998. ThirLy-Third IAS Annual Meeting. The 1998 IEEE, (Oct. 12-15, 1998), vol. 1 pp. 671-676.*
Ion Boldea "Active Flux" DTFC-SVM Sensorless Control of IPMSM, Jun. 2009 , IEEE, Transactions on Energy Conversion, vol. 24, No. 2, pp. 314-322.*
Boldea et al: "Active Flux" DTFC-SVM Sensorless Control of IPMSM IEEE Transactions on Energy Conversion, IEEE Service Center, Piscataway, NJ, US, vol. 24, No. 2, Jun. 1, 2009, pp. 314-322, XP011257939, ISSN: 0885-8969 pp. 315-317; figures 1-6.*
United Kingdom Search Report issued on Jan. 1, 2006.
European Search Report issued on Feb. 27, 2012.
Ion Boldea et al., "'Active Flux' DTFC-SVM Sensorless Control of IPMSM", IEEE Transactions on Energy Conversion, vol. 24, No. 2, Jun. 2009, pp. 314-322, X-011257939.
Ahmad Ghaderi et al., "A Novel Implementation of Low Speed Sensorless Vector Control of Synchronous Reluctance Motors with a New Online Parameter Identificatin Approach", Applied Power Electronics Conference and Exposition, Mar. 19, 2006, XP- 010909948.
Office Action issued by the U.S. Patent and Trademark Office in co-pending U.S. Appl. No. 13/401,328, mailed Jan. 16, 2014 (20 pages).
Ahmadi et al., "Integration of RCM and PHM for the Next Generation of Aircraft", Aerospace Conference, 2009 IEEE, (Mar. 7-14, 2009), pp. 1-9.

Boldea et al , "Active Flux" DTFC-SVM Sensorless Control of IPMSM, IEEE Transactions on Energy Conversion, (Jun. 2009), vol. 24, No. 2, pp. 314-322.
Kang et al., "Position Controlled Synchronous Reluctance Motor Without Rotational Transducer", Industry Applications Conference, 1998. Thirty-Third IAS Annual Meeting. The 1998 IEEE, (Oct. 12-15, 1998), vol. 1, pp. 671-676.
Nagrial et al., "Developments of Sensorless Synchronous Reluctance Drive Systems", Multi Topic Conference, 2001. IEEE INMIC 2001. Technology for the 21st Century. Proceedings. IEEE International, (2001), pp. 104-110.
Office Action (Notification of the Second Office Action) issued on Aug. 15, 2014, by the State Intellectual Property Office of People's Republic of China in corresponding Chinese Patent Application No. 201210039993.4, and an English Translation of the Office Action. (18 pages).
The extended European Search Report issued on Jan. 27, 2012, by the European Patent Office in European Patent Application No. 11155284.0-1242. (6 pages).
Office Action issued by the U.S. Patent and Trademark Office in the U.S. Appl. No. 13/401,328, mailed Jul. 31, 2014, U.S. Patent and Trademark Office, Alexandria, VA. (17 pages).
Office Action issued by the U.S. Patent and Trademark Office in U.S. Appl. No. 13/401,328, mailed May 8, 2015. (30 pages).
Jun. 24, 2011 United Kingdom Search Report issued in GB1103151. 5.
Richard C. Millar, "The Role of Reliability Data Bases in Deploying CBM+, RCM and PHM With TLCSM", Aerospace Conference, Mar. 1, 2008, 2008 IEEE, pp. 1-8.
Mihaela Codruta Paicu et al., "Wide Speed Range Sensorless Control of PM-RSM Via 'Active Flux Mode'", Energy Conversion Congress and Exposition, Sep. 20, 2009, pp. 3822-3829, XP-031560953.
Mihaela Codruta Paicu et al., "PM-RSM Sensorless Vector Control: Zero q-Axis Flux Versus Approximate Maximum Torque Per Current, with Experiments", Optimization of Electrical and Electronic Equipment (OPTIM), May 20, 2010, pp. 460-468, XP-031709392.
Sorin-Cristian Agarlita et al., "I-F Starting and Active Flux Based Sensorless Vector Control of Reluctance Synchronous Motors, with Experiments", Optimization of Electrical and Electronic Equipment (OPTIM), May 20, 2010, pp. 337-342, XP-031709397.
Tsuyoshi Hanamoto et al., "Sensorless Speed Control of Synchronuos Reluctance Motor using a Novel Flux Estimator Based on Recursive Fourier Transformation", Industrial Technology, Feb. 10, 2009, pp. 1-6, XP-031456757.
Ahmad Ghaderi et al., "A Novel Implementation of Low Speed Sensorless Vector Control of Synchronous Reluctance Motors with a New Online Parameter Identificatin Approach", Applied Power Electronics Conference and Exposition, Mar. 19, 2006, XP-010909948.

* cited by examiner

Legend

21 – Apparatus
22 – Supplying Grid
23 – Motor
24 – Motor Controller
25 – Flux Controller
26 – Stator Voltage Measuring Unit
27 – Stator Current Measuring Unit
28 – Voltage Model
29 – First Rotor Orientation Estimator
30 – First Rotor Speed Estimator

US 9,294,029 B2

METHOD AND APPARATUS FOR ESTIMATING ROTOR ANGLE AND ROTOR SPEED OF SYNCHRONOUS RELUCTANCE MOTOR AT START-UP

RELATED APPLICATION

This application claims priority under 35 U.S.C. §119 to European Patent Application No. 11155280.8 filed in Europe on Feb. 22, 2011, the entire content of which is hereby incorporated by reference in its entirety.

FIELD

The present disclosure relates to synchronous motors, and to estimating a rotor angle of a synchronous reluctance motor in start-up.

BACKGROUND INFORMATION

A synchronous motor is an AC motor including a rotor and a stator, distinguished by the rotor spinning synchronously with stator frequency. There are two major types of synchronous motors: non-excited and direct-current excited. Reluctance motors belong to the former group.

Before starting a synchronous motor, an initial angle and speed of a rotor of the motor usually have to be known. The initial angle and speed can, for instance, be detected by using a position sensor. The position sensor, however, add costs and unreliability to the system. Therefore, position-sensorless control methods have also been developed.

In a position-sensorless control, the speed and the angle may have to be detected at every start-up. It is known that the initial angle is forced with DC-magnetization (DC-rotation method) or, in the case of salient pole machines, detected with a signal injection method (AC-injection method). Both of these methods can be used in a start-up procedure of a synchronous reluctance motor (SYRM).

A problem associated with the above methods is that they can be utilized on a rotor at a standstill alone, though signal injection methods have also been proposed for detecting rotor speed and angle of a rotating rotor. Start-up methods designed for synchronizing with a rotating rotor of a permanent magnet synchronous machine (PMSM) are generally based on determining a back-EMF voltage of a rotating permanent magnet flux, but no such flux exists in the SYRM.

SUMMARY

An exemplary embodiment of the present disclosure provides a method of estimating a rotor orientation of a synchronous reluctance motor at a start-up, the motor including a stator and a rotor, wherein an inductance of the rotor in rotor coordinates is represented by a rotor quadrature axis inductance component (Lq) and a rotor direct axis inductance component (Ld), at least one of the rotor inductance components being known. The exemplary method includes inducing a stator flux, determining the stator flux and a stator current, and forming a first estimate of the rotor orientation on the basis of the stator flux, the stator current, and a known rotor inductance component. In addition, the exemplary method includes determining the rotor orientation on the basis of the first estimate.

An exemplary embodiment of the present disclosure provides an apparatus configured to be connected to a synchronous reluctance motor, which includes a stator and a rotor. The exemplary apparatus includes means for controlling a stator flux, and means for determining the stator flux and a stator current. The exemplary apparatus also includes means for forming a first estimate of a rotor angle on the basis of a known rotor inductance component, the stator flux, and the stator current. In addition, the exemplary apparatus includes means for estimating the rotor angle on the basis of the first estimate.

An exemplary embodiment of the present disclosure provides a non-transitory computer-readable recording medium having a computer program recorded thereon that causes a processor of a computer processing device to perform operations of estimating a rotor orientation of a synchronous reluctance motor at a start-up. The motor includes a stator and a rotor, and an inductance of the rotor in rotor coordinates is represented by a rotor quadrature axis inductance component ($L_q$) and a rotor direct axis inductance component ($L_d$), where at least one of the rotor inductance components being known. The operations include: includes inducing a stator flux; determining the stator flux and a stator current; forming a first estimate of the rotor orientation on the basis of the stator flux, the stator current, and a known rotor inductance component; and determining the rotor orientation on the basis of the first estimate.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a method and an apparatus for implementing the method so as to alleviate the above problems. For instance, an exemplary embodiment of the present disclosure provides a method of estimating a rotor orientation of a synchronous reluctance motor at a start-up, where the motor includes a stator and a rotor. An inductance of the rotor in rotor coordinates is represented by a rotor quadrature axis inductance component ($L_q$) and a rotor direct axis inductance component ($L_d$), where at least one of the rotor inductance components being known. The exemplary method includes inducing a stator flux, determining the stator flux and a stator current, and forming a first estimate of the rotor orientation on the basis of the stator flux, the stator current, and a known rotor inductance component. In addition, the exemplary method includes determining the rotor orientation on the basis of the first estimate. Exemplary embodiments of the present disclosure also provide an apparatus including elements for performing the method described above. Additional features of the present disclosure are disclosed with respect to exemplary embodiments illustrated in the drawings.

It is possible to determine the angle and the speed of the rotor of the SYRM by using a mathematical motor model utilizing saliency of the rotor. The saliency of the rotor has to be known beforehand. The rotor may be rotating or at a standstill. When direct (d) axis and/or quadrature (q) axis inductances are known, the rotor position can be derived from the computational voltage and current models of the SYRM, provided there is a stator flux in the motor.

An advantage of the method and arrangement of the present disclosure is that only one start-up procedure is required for a rotating or motionless rotor.

Another advantage is that the method starts up the motor in asignificantly shorter period of time than the AC-injection or DC-rotation methods. An estimated duration for the method of the present disclosure to detect the angle and the speed may be less than 20 ms. A typical AC-injection method requires 100 ms. A DC-rotation method may take seconds to complete.

After the start-up procedure, the d-axis is magnetized and the control is running. Owing to small flux in directions other than the d-axis direction, the method does not affect the rotating speed of the motor. Therefore, the start is smooth.

In machine types like permanent magnet motors and induction motors, a rotor flux component may not be unambiguously determinable from a stator voltage integral. There is no permanent magnet flux in a SYRM, so the stator flux and the stator current are directly bound to each other by an inductance relation in rotor coordinates.

The inductance in the rotor coordinates is represented by two components: a d-axis inductance component $L_d$ and a q-axis inductance component $L_q$. A difference between these two parameters is a basis for operation of a reluctance motor.

If at least one of the inductance components is known, a rotor orientation of a synchronous reluctance motor can be estimated, even at a start-up. An initial stator flux is first induced. The values of the stator flux and a stator current are then determined. A first estimate of the rotor orientation may then be formed on the basis of the stator flux, the stator current, and a known rotor inductance component. A direct axis oriented rotor orientation vector $\vec{\theta}_d$ may be calculated from the difference between the stator flux $\vec{\psi}_s$ and a product of an inductance component $L_q$ and the stator current $\vec{i}_s$, as follows:

$$\vec{\theta}_d = \pm(\vec{\psi}_s - L_q \vec{i}_s). \quad (1)$$

The $\pm$ sign in Equation 1 represents two different rotor orientations related to the same pole. In general, there is no difference between these orientations owing to the lack of a permanent magnet induced flux, and therefore in some embodiments the signs can be omitted.

Similarly, a quadrature axis oriented rotor orientation vector $\vec{\theta}_q$, may be calculated using the other inductance component $L_d$ as follows:

$$\vec{\theta}_q = \pm(\vec{\psi}_s - L_d \vec{i}_s). \quad (2)$$

In some embodiments, the first estimate may be formed on the basis of the orientation vector of Equation 1 or 2. The rotor orientation may then be determined on the basis of the first estimate.

The estimated rotor orientation may also be represented in the form of an angle. The vectors of Equations 1 and 2 may be used to estimate a rotor orientation angle which can then be used as the first estimate. The first estimate may be determined on the basis of a ratio between an x component and an y component of an orientation vector $\vec{\theta}_d$ or $\vec{\theta}_q$, for instance, as follows:

$$\theta_{est} = \arctan\left(\frac{\theta_x}{\theta_y}\right) + \frac{\pi}{2} \pm \frac{\pi}{2}, \quad (3)$$

where $\theta_{est}$ is the estimated rotor orientation angle, $\theta_x$ and $\theta_y$ are the x and y components of the orientation vector. The $\pm$ sign represents two different rotor orientation angles related to a same pole.

If both inductance components are known, a second estimate of the rotor orientation may also be formed on the basis of the stator flux, the stator current, and the other known rotor inductance component. The second estimate may be represented by an orientation vector or an angle calculated, for instance, using Equation 3. The rotor orientation may be estimated on the basis of the first estimate and the second estimate. The first and second estimates may be formed such that they have the same orientation, and they can be used together to estimate the rotor orientation. For instance, by rotating a quadrature axis oriented vector of Equation 2 by 90 degrees, a direct axis oriented vector may be formed. The rotor orientation may then be estimated using the two orientation vectors, for instance by summing up the two vectors. Alternatively, a sum of two estimated orientation angles may be used.

One way to implement the method of the present disclosure is disclosed next. After the stator flux and stator current are determined, two orthogonal stator flux components in a stator reference frame are calculated from the stator flux, and two orthogonal stator current components in the stator reference frame are calculated from the stator current. The first estimate of the rotor orientation is then formed on the basis of the stator flux components, the stator current components, and a known rotor inductance component, and the second estimate of the rotor orientation is formed on the basis of the stator flux components, the stator current components, and the other known rotor inductance component. For instance, by using Equations 1 and 2, it is possible to calculate two rotor orientation vectors: a first rotor orientation vector $\vec{\theta}_{d,1}$ and a second rotor orientation vector $\vec{\theta}_{d,2}$ as follows:

$$\vec{\theta}_{d,1} = \pm(\psi_x - L_q i_x + j(\psi_y - L_q i_y)), \quad (4)$$

$$\vec{\theta}_{d,2} = \pm(L_d i_y - \psi_y + j(\psi_x - L_d i_x)). \quad (5)$$

where $\psi_x$ and $\psi_y$ are two orthogonal stator flux components in a stator reference frame, calculated from the stator flux $\vec{\psi}_s$, and $i_x$ and $i_y$ are two orthogonal stator current components in the stator reference frame, calculated from the stator current $\vec{i}_s$. In Equation 5, the quadrature oriented vector of Equation 2 is rotated by 90 degrees by switching the real part and the imaginary part of the vector, and by multiplying the new real part by −1.

Figure 1A:
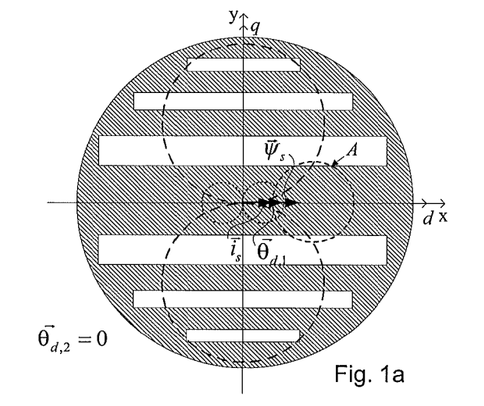
FIGS. 1a, 1b, and 1c illustrate loci of d-axis oriented rotor orientation vectors and a stator current as functions of a rotor angle.
Figure 1B:
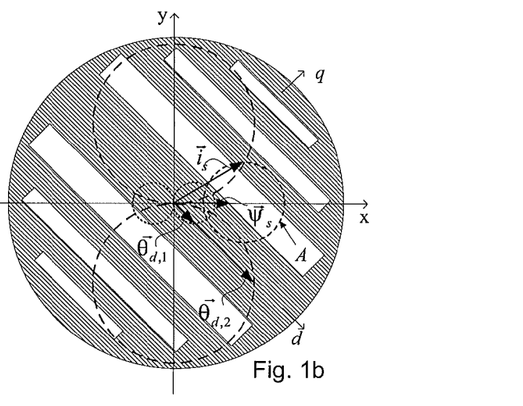
Figure 1C:
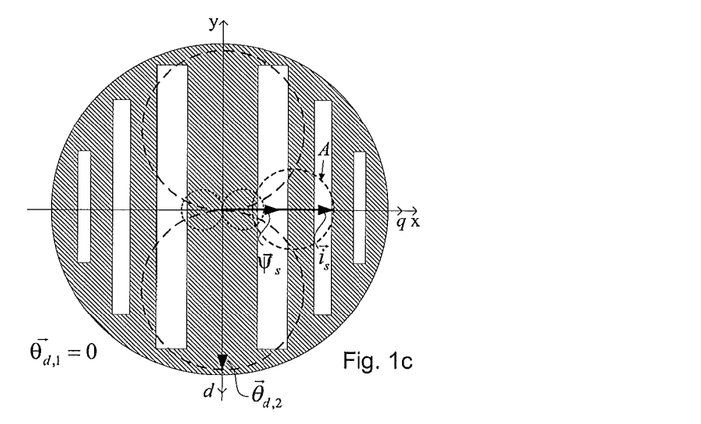

The two rotor orientation vectors in Equations 4 and 5 are both always aligned with the rotor d-axis. This can be seen in FIGS. 1a, 1b, and 1c, which show the loci of the d-axis oriented rotor orientation vectors and the stator current as functions of a rotor angle. As the rotor turns in respect of the stator flux $\vec{\psi}_s$, the stator current vector $\vec{i}_s$ end follows a circle A. The circle A has its centre aligned with the stator flux vector $\vec{\psi}_s$. In FIGS. 1a, 1b, and 1c, the stator flux $\vec{\psi}_s$ is kept constant at x-axis, d-axis inductance component $L_d$ is 2, and q-axis inductance component $L_q$ is 0.5. The stator current vector $\vec{i}_s$ end makes a full round along the circle A as the rotor rotates a full electrical angle. In the case of a single pole-pair motor, as in FIGS. 1a, 1b, and 1c, this means that the stator current vector $\vec{i}_s$ end makes two full rounds as the rotor mechanically rotates a full round.

The d-axis oriented first rotor orientation vector $\vec{\theta}_{d,1}$ has a zero length point when the stator flux is aligned with the q-axis, and the d-axis oriented second rotor orientation vector $\vec{\theta}_{d,2}$ has a zero length point when the stator flux is aligned with the d-axis. A first and a second rotor orientation vector aligned with q-axis may also be calculated in a similar manner.

In theory, the estimators should give perfect orientation estimates in all other orientations but the zero length orientations. In practice, parameter errors related to $L_d$ and $L_q$ may significantly affect the accuracy anywhere near the zero length orientations. Therefore, the first rotor orientation vector $\vec{\theta}_{d,1}$ and the second rotor orientation vector $\vec{\theta}_{d2}$ may be used together for estimating the rotor orientation. As the inductance components are not equal, maximum lengths of the orientation vectors using different inductance components are not equal. The length of a vector may be corrected using a correction parameter. Thus, a third orientation vector $\vec{\theta}_{d,sum}$ may be formed, for instance, as follows:

$$\vec{\theta}_{d,sum} = \vec{\theta}_{d,1} + l\vec{\theta}_{d,2}, \quad (6)$$

where l is a parameter for which a value can be determined, for instance, on the basis of a ratio between the rotor inductance components.

If both estimators are used together, the correct signs may have to be selected in order to have consistent orientations in every quarter of the rotor coordinates.

A rotor orientation angle may be determined on the basis of a ratio between an x component and an y component of the first, second, or third rotor orientation vector. A rotor direct axis angle can, for instance, be calculated from the rotor orientation vectors $\vec{\theta}_{d,1}$, $\vec{\theta}_{d,2}$ and $\vec{\theta}_{d,sum}$ with the following rotor orientation angle estimators $\vec{\theta}_{est,1}$, $\vec{\theta}_{est,2}$, and $\vec{\theta}^{est,sum}$, respectively:

$$\theta_{est,1} = \arctan\left(\frac{\psi_y - L_q i_y}{\psi_x - L_q i_x}\right) + \frac{\pi}{2} \pm \frac{\pi}{2} \quad (7)$$

$$\theta_{est,2} = \arctan\left(\frac{\psi_x - L_d i_x}{L_d i_y - \psi_y}\right) + \frac{\pi}{2} \pm \frac{\pi}{2} \quad (8)$$

$$\theta_{est,sum} = \arctan\left(\frac{\psi_y - L_q i_y \pm k(\psi_x - L_d i_x)}{\psi_x - L_q i_x \pm k(L_d i_y - \psi_y)}\right) + \frac{\pi}{2} \pm \frac{\pi}{2} \quad (9)$$

The numerators and the denominators of these estimators are the y and x components of the d-axis oriented rotor orientation vectors $\vec{\theta}_{d,1}$ and $\vec{\theta}_{d,2}$. Similarly to Equation 3, the ± sign here represents two different rotor orientation angles related to a same pole.

The rotor orientation angle estimator $\vec{\theta}_{est,1}$ may, for instance, be used to produce the first estimate, and the rotor orientation angle estimator $\vec{\theta}_{est,2}$ may then be used to produce the second estimate. As illustrated in FIGS. 1a, 1b, and 1c, The estimator $\vec{\theta}_{est,1}$ is more accurate when the stator flux is near the d-axis of the rotor. Correspondingly, the estimator $\vec{\theta}_{est,2}$ is more accurate when the stator flux is near the q-axis of the rotor. The rotor orientation angle estimator $\vec{\theta}_{est,sum}$ is a combination of the first and the second rotor orientation angle estimator. As the orientation vectors $\vec{\theta}_{d,1}$ and $\vec{\theta}_{d,2}$ are never at a zero length point at the same time, the estimator $\vec{\theta}_{est,sum}$ is accurate at any angle.

The above estimation method can be used to determine the rotor orientation at start-up. Since there are no permanent magnets in the rotor of the SYRM, there are two possible initial angles per pole. These initial angles are equal and any one thereof can be used as a rotor orientation for the motor control.

The initial angles may be found in the following manner. First, a small stator flux is generated to the machine by injecting a dc-voltage to the stator winding. A small flux value can easily be controlled to the stator, for instance with a known flux or current controller. The value of the flux can then be estimated using various methods. The amount of stator current is determined. As the stator flux and the stator current are known, the rotor orientation may be calculated using the first and second estimates.

If the rotor is rotating at a speed that is not known, the speed can be estimated on the basis of the estimated orientation. For instance, a speed estimate can be calculated from a time derivate of the rotor position. A simple phase locked loop (PLL) can also be utilized to obtain a filtered speed estimate from the orientation angle estimator $\vec{\theta}_{est,1}$) the orientation angle estimator $\vec{\theta}_{est,2}$, or a combination of the estimators. Other methods may also be used to obtain a speed estimate from the estimated rotor orientation.

Figure 2:
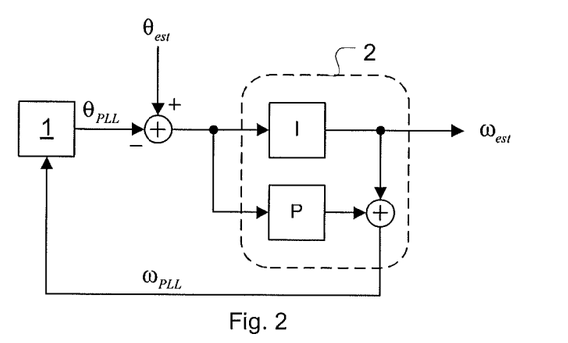
FIG. 2 illustrates a simplified diagram of a phase locked loop (PLL) configured for estimating a rotor speed of a synchronous reluctance motor according to an exemplary embodiment of the present disclosure.

FIG. 2 illustrates a simplified diagram of a PLL configured for estimating the rotor speed of a synchronous reluctance motor on the basis of the estimated rotor orientation angle $\vec{\theta}_{est}$.

The PLL calculates an estimate $\omega_{est}$ for the rotor speed on the basis of a difference between a feedback angle term $\vec{\theta}_{PLL}$ and the rotor orientation angle $\vec{\theta}_{est}$. A value for a feedback angle term $\vec{\theta}_{PLL}$ is calculated by integrating, using integrating means 1 (e.g., processing circuitry), the feedback speed term cop$_a$, for which a value is determined on the basis of a difference between the feedback angle term $\vec{\theta}_{PLL}$ and the rotor orientation angle $\vec{\theta}_{est}$. The value for a feedback speed term $\omega_{PLL}$ may, for instance, be determined using a PI controller 2, as in FIG. 2. An integrative part I of the PI-controller 2 is also used to produce the speed estimate $\omega_{est}$. When the speed and the angle of the rotor are known, a higher level control can be started.

Speed tracking increases the duration of the start-up procedure since the PLL estimate needs time to settle. If the rotor is at a standstill, a start-up procedure may be continued with d-axis magnetization and normal torque control start directly after detection of the initial rotor orientation. In a generic start procedure, where the rotor may be rotating or at a standstill, the speed estimation is, however, required.

As shown in FIGS. 1a, 1b, and 1c, tracking of the rotor orientation at an arbitrary position may require utilization of both the first and second estimates, and correct sign modification, if the stator flux is kept constant. However, it is possible to track the orientation with only the first estimate, if the stator flux is controlled to follow the orientation of the rotor in a way that keeps a flux angle between the flux and a d-axis of a rotor pole pair smaller than 90 degrees. This may, for instance, be accomplished by using a flux controller as the higher level control. A current controller may also be used. When the stator current is in the d-axis direction, the stator flux is aligned with it and flux tracking is obtained. The current control has the benefit that it keeps the current from increasing to an unnecessarily high value in transients where the flux is not in the d-axis direction.

The orientation angle estimator $\vec{\theta}_{est,1}$ may, for instance, be used for the first estimate. Usually in the normal operation of the motor, the d-axis is magnetized and the flux angle is lower than 45 degrees. When torque is controlled to zero, the flux angle is zero and only the d-axis is magnetized. When the stator flux is near the d-axis, in other words the flux angle is near zero, the estimator $\vec{\theta}_{est,1}$ is in its most accurate area, and parameter errors have only a small influence. This makes the estimation very robust against errors in the rotor q-axis inductance component $L_q$, which has to be known before the method can be used.

The above-disclosed methods may be used, together with controlling the flux, to estimate the rotor orientation at a start-up. A value is set for a stator control reference. The stator control reference may, for instance, represent a desired direction and magnitude of the stator flux or stator current. The stator flux is then induced on the basis of the stator control reference. Initially, the flux control can be started in an arbitrary direction. When the stator flux begins to increase in the controlled direction, the first estimate may be used to determine the rotor orientation. The stator control reference is then updated so that the stator flux follows the determined rotor orientation.

For instance, the first estimate may be calculated using the orientation vector $\vec{\theta}_{d,1}$ of Equation 4, in which case the calculated orientation represents the direction of the rotor d-axis. The value of the estimated rotor orientation may then be given as an input for a flux controller which then starts controlling the flux to align with the estimated direction of the rotor d-axis. In the beginning the orientation estimate can be very inaccurate, but as a flux component in the estimated direction of the d-axis increases, the accuracy of the orientation estimate improves. At the end of the start-up procedure, the stator flux is rotating in synchrony and in phase with the rotor d-axis.

Estimation of the speed with the PLL-structure may be started at the same time as the flux control. At the end of the start-up sequence, the rotor speed is also known. When the speed and orientation are stabilized, the d-axis can be magnetized to a value set by a higher level controller. If the above start-up procedure is used, all parts of the control system are active at the end of the start sequence and there are no unnecessary transients at the beginning of normal control operation.

The start-up procedure may be implemented in many different ways by using the estimates and estimators described above. One practical solution is to use only the orientation vector $\vec{\theta}_{d,1}$ and control the stator current or the stator flux to align with the d-axis. This makes the estimation very robust against errors in parameter $L_q$, which has to be known before the method can be used.

Current or flux control may be used to turn the flux and the current into the d-axis direction. There is no difference in the result, but the flux and current variations before reaching a d-axis aligned flux/current are different. The feasibility of these options is determined on the basis of a general control structure used in the embodiment utilizing the start-up procedure.

Figure 3:
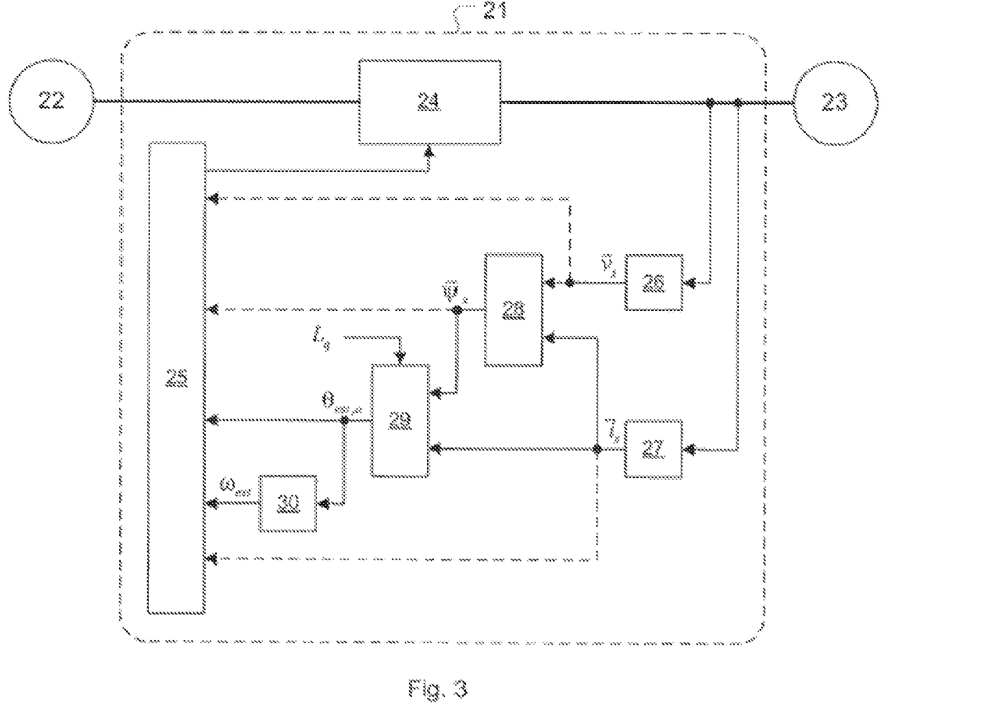
FIG. 3 illustrates an exemplary arrangement to which a method of the disclosure may be applied.

FIG. 3 illustrates an arrangement where an apparatus 21 is connected between a supplying grid 22 and a synchronous reluctance motor 23. The motor 23 includes a stator and a rotor. A rotor quadrature axis inductance component $L_q$ is known. The apparatus 21 is capable of controlling the motor 23, using a motor controller. In FIG. 3, the apparatus 21 is a frequency converter and the motor controller is an inverter bridge 24. The inverter bridge 24 is controlled by a flux controller 25. Other controllers, such as a current controller, may be used. The flux controller 25 uses an estimated rotor orientation and speed as input parameters. The controller may, as in FIG. 3, also use other inputs, such as a stator current, a stator voltage or a stator flux.

In the arrangement, the stator flux and the stator current are determined to estimate the rotor orientation and speed. Thus, the apparatus includes a stator voltage measuring unit 26 and a stator current measuring unit 27. The stator current measuring unit 27 also calculates two orthogonal stator current components in a stator reference frame from the stator current.

The stator flux is then determined using a voltage model 28 as means for determining the stator flux. The voltage model 28 calculates the flux as an integral of the stator voltage minus resistive losses. The voltage model 28 also calculates current components in the stator reference frame from the stator current.

The apparatus 21 includes a first rotor orientation estimator 29. The first rotor orientation estimator 29 uses the stator flux components, the stator current components, and one of the known rotor inductance components as inputs. It produces a first estimate of the rotor orientation. The orientation may, for instance, be represented by an orientation vector or an angle. The first rotor orientation estimator 29 may, for instance, calculate a d-axis oriented first rotor orientation vector by using the known rotor q-axis inductance component $L_q$, the stator flux components, and the stator current components, as defined in Equation 1. The first rotor orientation estimator 29 may, for example, use the d-axis oriented first rotor orientation vector of Equation 4 to represent the rotor orientation, or calculate an orientation angle from the first rotor orientation vector, for instance, as defined in Equation 7.

The apparatus also includes a first rotor speed estimator 30. The estimator 30 estimates the rotor speed of a synchronous reluctance motor on the basis of the estimated rotor orientation. The method may, for instance, be the same as disclosed in FIG. 2 and the description related to FIG. 2. An initial value is first set for a feedback speed term. A value for a feedback angle term is then calculated by integrating the feedback speed term. An estimate for the rotor speed is determined on the basis of a difference between the feedback angle term and the rotor orientation. A new value for the feedback speed term is determined on the basis of a difference between the feedback angle term and the rotor orientation.

At a start-up of the arrangement of FIG. 3, the rotor orientation is not known. To start up, the flux controller 25 may be given a stator flux reference in an arbitrary direction. The inverter bridge 24 then controls the stator flux such that the stator flux follows the stator flux reference. As the stator flux begins to increase in the direction of the stator flux reference, the first rotor orientation estimator 29 gives an estimate of the rotor orientation. The estimated rotor orientation may, for example, represent the direction of the rotor d-axis. Estimation of the speed with the rotor speed estimator 30 is started at the same time as the flux control.

The stator flux reference is then updated, on the basis of the rotor orientation, so that the stator flux follows the rotor orientation. In the arrangement of FIG. 3, the rotor orientation points in the direction of the rotor d-axis. The estimated rotor d-axis direction is given as a new stator flux orientation reference for the flux controller 25. The flux controller 25 starts to control the flux to the rotor d-axis direction. As the flux component increases in the direction of the rotor d-axis, accuracy of the first estimate increases. At the end of the start procedure, the stator flux is rotating in synchrony and in phase with the rotor d-axis. Due to the d-axis controlled flux, the method is robust against errors in the $L_q$ parameter.

If both of the rotor inductance components are known, the method may further comprise a second rotor orientation estimator. The second rotor orientation estimator may use the stator flux components, the stator current components, and the known other rotor inductance components as inputs. It produces a second estimate of the rotor orientation. The second rotor orientation estimator may, for instance, calculate a d-axis oriented second rotor orientation vector, using d-axis rotor inductance component $L_d$, the stator flux components, and the stator current components, as defined in Equation 5. The second rotor orientation estimator may then form a second estimate directly on the basis of the d-axis oriented second rotor orientation vector, or use an orientation angle as the second estimate, for instance as defined in Equation 8.

The rotor angle is then estimated on the basis of the first estimate and the second estimate. In a start-up situation, the controller may, for instance, control the motor control means to inject a dc-voltage to the stator and thus generate a small stator flux. The stator flux is kept constant. The rotor angle at an arbitrary position is then tracked utilizing both the first and the second rotor angle estimator.

The method and related apparatus are described above with reference to the respective functions they perform according to the above-described exemplary embodiments. It is to be understood that one or more of these elements and functions can be implemented in a hardware configuration. For example, the respective components may comprise a computer processor configured to execute computer-readable instructions (e.g. computer-readable software), a non-volatile computer-readable recording medium, such as a memory element (e.g. ROM, flash memory, optical memory, hard disk drive, etc.) configured to store such computer-readable instructions, and a volatile computer-readable recording medium (e.g. RAM) configured to be utilized by the computer processor as working memory while executing the computer-readable instructions. The methods and related apparatus may also be configured to sense, generate and/or operate in accordance with analog signals, digital signals and/or a combination of digital and analog signals to carry out their intended functions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of estimating a rotor orientation of a synchronous reluctance motor at a start-up, the motor including a stator and a rotor, wherein an inductance of the rotor in rotor coordinates is represented by a rotor quadrature axis inductance component ($L_q$) and a rotor direct axis inductance component ($L_d$), at least one of the rotor inductance components being known, wherein the method comprises:
    setting a value for a stator control reference;
    inducing a stator flux on the basis of the stator control reference;
    determining the stator flux and a stator current;
    forming a first estimate of the rotor orientation on the basis of the stator flux, the stator current, and only one of the known rotor inductance components;
    determining the rotor orientation on the basis of the first estimate; and updating the stator control reference so that the stator flux follows the determined rotor orientation.

2. A method according to claim 1, wherein both of the rotor inductance components are known, and the determining of the rotor orientation comprises:
    forming a second estimate of the rotor orientation on the basis of the stator flux, the stator current, and the other known rotor inductance component,
    determining the rotor orientation on the basis of the first estimate and the second estimate.

3. A method according to claim 2, wherein the determining of the rotor orientation comprises:
    determining a value for a correction parameter on the basis of a ratio between the rotor inductance components, and
    using the correction parameter to correct a length of an orientation vector.

4. A method according to claim 2, wherein the forming of the second estimate of the rotor orientation comprises:
    calculating a second rotor orientation vector from a difference between the stator flux and a product of the other known inductance component and the stator current, and
    forming the second estimate on the basis of the second rotor orientation vector.

5. A method according to claim 1, wherein the forming of the first estimate of the rotor orientation comprises:
    calculating a first rotor orientation vector from a difference between the stator flux and a product of the known inductance component and the stator current, and
    forming a first estimate on the basis of the first rotor orientation vector.

6. A method according to claim 1, wherein the forming of the first estimate of the rotor orientation comprises:
    calculating a first rotor orientation vector from the difference between the stator flux and a product of the known inductance component and the stator current, and
    forming the first estimate on the basis of a ratio between an x component and a y component of the first rotor orientation vector.

7. A method according to claim 1, comprising: estimating a rotor speed of a synchronous reluctance motor on the basis of the estimated rotor orientation.

8. A method according to claim 7, wherein the estimating of the rotor speed comprises:
    setting a value for a feedback speed term;
    calculating a value for a feedback angle term by integrating the feedback speed term;
    determining an estimate for the rotor speed on the basis of a difference between the feedback angle term and the rotor angle; and
    determining a new value for a feedback speed term speed on the basis of a difference between the feedback angle term and the rotor angle.

9. A method according to claim 1, wherein the at least one of the known rotor inductance components is known prior to start-up of the motor.

10. An apparatus configured to be connected to a synchronous reluctance motor, the motor including a stator and a rotor, wherein an inductance of the rotor in rotor coordinates is represented by a rotor quadrature axis inductance component ($L_q$) and a rotor direct axis inductance component ($L_d$), at least one of the rotor inductance components being known, and wherein the apparatus comprises:

means for setting a value for a stator control reference;

means for controlling a stator flux on the basis of the stator control reference;

means for determining the stator flux and a stator current;

means for forming a first estimate of a rotor angle at a start-up on the basis of the stator flux, the stator current, and only one of the known rotor inductance components;

means for estimating the rotor angle on the basis of the first estimate; and means for updating the stator control reference so that the stator flux follows the determined rotor orientation.

11. An apparatus according to claim 10, wherein the at least one of the known rotor inductance components is known prior to start-up of the motor.

12. A non-transitory computer-readable recording medium having a computer program recorded thereon that causes a processor of a computer processing device to perform operations of estimating a rotor orientation of a synchronous reluctance motor at a start-up, the motor including a stator and a rotor, wherein an inductance of the rotor in rotor coordinates is represented by a rotor quadrature axis inductance component ($L_q$) and a rotor direct axis inductance component ($L_d$), at least one of the rotor inductance components being known, wherein the operations comprise:

setting a value for a stator control reference;

inducing a stator flux on the basis of the stator control reference;

determining the stator flux and a stator current;

forming a first estimate of the rotor orientation on the basis of the stator flux, the stator current, and only one of the known rotor inductance components;

determining the rotor orientation on the basis of the first estimate; and updating the stator control reference so that the stator flux follows the determined rotor orientation.

13. A non-transitory computer-readable recording medium according to claim 12, wherein both of the rotor inductance components are known, and the determining of the rotor orientation comprises:

forming a second estimate of the rotor orientation on the basis of the stator flux, the stator current, and the other known rotor inductance component, determining the rotor orientation on the basis of the first estimate and the second estimate.

14. A non-transitory computer-readable recording medium according to claim 13, wherein the determining of the rotor orientation comprises:

determining a value for a correction parameter on the basis of a ratio between the rotor inductance components, and using the correction parameter to correct a length of an orientation vector.

15. A non-transitory computer-readable recording medium according to claim 13, wherein the forming of the first estimate of the rotor orientation comprises:

calculating a first rotor orientation vector from a difference between the stator flux and a product of the known inductance component and the stator current, and forming a first estimate on the basis of the first rotor orientation vector.

16. A non-transitory computer-readable recording medium according to claim 13, wherein the forming of the first estimate of the rotor orientation comprises:

calculating a first rotor orientation vector from the difference between the stator flux and a product of the known inductance component and the stator current, and forming the first estimate on the basis of a ratio between an x component and a y component of the first rotor orientation vector.

17. A non-transitory computer-readable recording medium according to claim 13, wherein the forming of the second estimate of the rotor orientation comprises:

calculating a second rotor orientation vector from a difference between the stator flux and a product of the other known inductance component and the stator current, and forming the second estimate on the basis of the second rotor orientation vector.

18. A non-transitory computer-readable recording medium according to claim 13, comprising:

estimating a rotor speed of a synchronous reluctance motor on the basis of the estimated rotor orientation.

19. A non-transitory computer-readable recording medium according to claim 18, wherein the estimating of the rotor speed comprises:

setting a value for a feedback speed term;

calculating a value for a feedback angle term by integrating the feedback speed term;

determining an estimate for the rotor speed on the basis of a difference between the feedback angle term and the rotor angle; and determining a new value for a feedback speed term speed on the basis of a difference between the feedback angle term and the rotor angle.

20. A non-transitory computer-readable recording medium according to claim 12, wherein the at least one of the known rotor inductance components is known prior to start-up of the motor.

* * * * *

UNITED STATES PATENT AND TRADEMARK OFFICE
CERTIFICATE OF CORRECTION

| | |
|---|---|
| PATENT NO. | : 9,294,029 B2 |
| APPLICATION NO. | : 13/401081 |
| DATED | : March 22, 2016 |
| INVENTOR(S) | : Matti Veijanen |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 162 days.

Signed and Sealed this
Fourteenth Day of June, 2016

Michelle K. Lee
*Director of the United States Patent and Trademark Office*